United States Patent
Wu et al.

(10) Patent No.: US 10,804,761 B2
(45) Date of Patent: Oct. 13, 2020

(54) ROTOR MECHANISM AND METHOD FOR MANUFACTURING THE SAME

(71) Applicant: INDUSTRIAL TECHNOLOGY RESEARCH INSTITUTE, Hsinchu (TW)

(72) Inventors: Yu-Hsun Wu, Taipei (TW); Ming-Mao Hsu, Taichung (TW); Yu-Yuan Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 225 days.

(21) Appl. No.: 15/831,378

(22) Filed: Dec. 4, 2017

(65) Prior Publication Data

US 2019/0140506 A1     May 9, 2019

(30) Foreign Application Priority Data

Nov. 3, 2017    (TW) .............................. 106138060 A (51) Int. Cl.
     *H02K 17/16*      (2006.01)
     *H02K 3/14*      (2006.01)
     (Continued)

(52) U.S. Cl.
     CPC ............ *H02K 3/14* (2013.01); *B22D 19/0054* (2013.01); *H02K 15/0012* (2013.01); *H02K 17/165* (2013.01); *H02K 1/265* (2013.01)

(58) Field of Classification Search
CPC ....... H02K 17/15; H02K 17/165; H02K 17/18
See application file for complete search history.

(56) References Cited

U.S. PATENT DOCUMENTS

| | | | |
|---|---|---|---|
| 1,546,068 A | 7/1925 | Hansen et al. | |
| 2,333,200 A | * 11/1943 | Roe ....................... | H02K 17/165 310/211 |

(Continued)

FOREIGN PATENT DOCUMENTS

| | | |
|---|---|---|
| CN | 1764045 A | 4/2006 |
| CN | 101582615 A | 11/2009 |

(Continued)

OTHER PUBLICATIONS

CN Office Action in Application No. 2017111838675 dated Jan. 19, 2020.

(Continued)

*Primary Examiner* — Dang D Le
(74) *Attorney, Agent, or Firm* — Maschoff Brennan (57) ABSTRACT

The present disclosure provides a rotor mechanism includes a rotor core and a plurality of rotor bars. The rotor core has a plurality of insertion slots arranged along an edge of the rotor core. Each of the plurality of rotor bars has an insertion portion and two protruding portions. The insertion portions are respectively located in the plurality of insertion slots, wherein in each of the plurality of rotor bars, the two protruding portions are respectively connected to two opposite ends of the insertion portion and respectively protrude from two opposite sides of the rotor core, and the two protruding portions each has an extension direction, that has an angle with respect to an extension direction of the insertion portion, in order to clamp and fix the rotor core therebetween. In addition, the present disclosure also provides a method for manufacturing the rotor mechanism.

7 Claims, 6 Drawing Sheets

(51) Int. Cl.
    *B22D 19/00*    (2006.01)
    *H02K 15/00*    (2006.01)
    *H02K 1/26*     (2006.01)

(56) References Cited

U.S. PATENT DOCUMENTS

| | | | | |
|---|---|---|---|---|
| 2,350,012 | A * | 5/1944 | Brady | H02K 17/165 |
| | | | | 310/211 |
| 2,386,138 | A * | 10/1945 | Pancher | H02K 17/165 |
| | | | | 310/211 |
| 5,144,175 | A * | 9/1992 | Craggs | H02K 1/32 |
| | | | | 310/61 |
| 7,302,750 | B2 * | 12/2007 | Niimi | H02K 3/12 |
| | | | | 29/596 |
| 8,963,394 | B2 * | 2/2015 | Buttner | B22D 19/0054 |
| | | | | 310/211 |
| 9,621,012 | B2 * | 4/2017 | Agapiou | H02K 17/165 |
| 2005/0012418 | A1 | 1/2005 | Chou et al. | |
| 2012/0286618 | A1 | 11/2012 | Alexander et al. | |

FOREIGN PATENT DOCUMENTS

| | | |
|---|---|---|
| CN | 201656717 U | 11/2010 |
| CN | 106253597 A | 12/2016 |
| DE | 102010041788 A1 | 4/2012 |
| JP | H10174386 A | 6/1998 |
| JP | 2009296761 A | 12/2009 |
| TW | 340983 B | 9/1998 |
| TW | M302825 U | 12/2006 |

OTHER PUBLICATIONS

Copper versus aluminum-which construction is best, Mark Hodowanec & William R. Finley, IEEE Industry Applications Magazine, 2002, p. 1-12.

Fabricated Aluminum Rotor Construction for Induction Motors, Edward C. Hartung, GE Motors Fort Wayne, IN, 1994, p. 76-80.

Investigation on the Mechanical and Electromagnetical Performance of a Squirrel Cage Induction Machine with Radially Laser Welded End Ring Connections, Volker Voggeser, Michael WolfThomas Schuhmann, Jens Liebold, 2015 5th International Electric Drives Production Conference, 2015, p. 1-8.

Selection of Copper versus Aluminum Rotors for Induction Motors, William R. Finley, Senior, Member, IEEE, and Mark M. Hodowanec, Senior Member, IEEE, IEEE Transactions on Industry Applications, vol. 37, No. 6, Nov./Dec. 2001, 2001, p. 1563-1573.

A Comparative Study Between Copper and Aluminum Induction Squirrel Cage Constructions, Renato Yabiku, P.E. Rafael Fialho Luis Teran, P.E. Alexandre Santos, P.E Estellito Rangel Jr, P. E. Diogenes Dutra, P.E., Copyright Material IEEE, Paper No. PCIC-2010-44, 2010, p. 1-9.

Comparison of Copper Rotor Bars with Aluminium Rotor Bars using FEM software—A Performance Evaluation, I. Daut, K. Anayet, N. Gomesh, M. Asri, Y.M.Irwan, 2009 Second International Conference on Computer and Electrical Engineering, 2009, p. 456-459.

TW Office Action dated Oct. 3, 2018 as received in Application No. 106138060.

* cited by examiner

ROTOR MECHANISM AND METHOD FOR MANUFACTURING THE SAME

CROSS-REFERENCE TO RELATED APPLICATIONS

This non-provisional application claims priority under 35 U.S.C. § 119(a) on Patent Application No(s). 106138060 filed in Taiwan, R.O.C. on Nov. 3, 2017, the entire contents of which are hereby incorporated by reference.

TECHNICAL FIELD

The disclosure relates to a rotor mechanism and a method, more particularly to a rotor mechanism including a rotor bar having protruding portions, and a method for manufacturing the same.

BACKGROUND

Electric motors can convert electrical energy into mechanical energy through electromagnetic interactions. The electric motors are widely used in daily life and applied to many fields. For example, the electric motors can be applied to machine tools, water pumps, light machineries, wind power systems, hydroelectric power generation systems and the like. The electric motors are fundamental machines in industry and closely linked with economic development.

Induction motor, is one of the most widely used types in electric motor. In the conventional structure of the induction motor, when current is applied into the stator, the air gap will produce synchronous rotation of the magnetomotive force, and the rotor conductors on the rotor core would produce induced voltage while encounter the magnetomotive force, and the end rings on the two opposite sides of the rotor core would form a short circuit on the rotor core in order to produce induced current on the rotor core, such that a magnetic field is generated on the rotor core to cause it to rotate.

SUMMARY

One embodiment of the disclosure provides a rotor mechanism including a rotor core and a plurality of rotor bars. The rotor core has a plurality of insertion slots arranged along an edge of the rotor core. Each of the plurality of rotor bars has an insertion portion and two protruding portions. The insertion portions are respectively located in the plurality of insertion slots, wherein in each of the plurality of rotor bars, the two protruding portions are respectively connected to two opposite ends of the insertion portion and respectively protrude from two opposite sides of the rotor core, and the two protruding portions each has an extension direction, that has an angle with respect to an extension direction of the insertion portion, in order to clamp and fix the rotor core therebetween.

One embodiment of the disclosure provides a method for manufacturing a rotor mechanism, including disposing through a plurality of rotor bars a plurality of insertion slots of a rotor core, respectively, and deforming the protruding portions of the plurality of rotor bars that penetrate through two opposite sides of the rotor core, such that the rotor core is clamped and fixed by the protruding portions.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
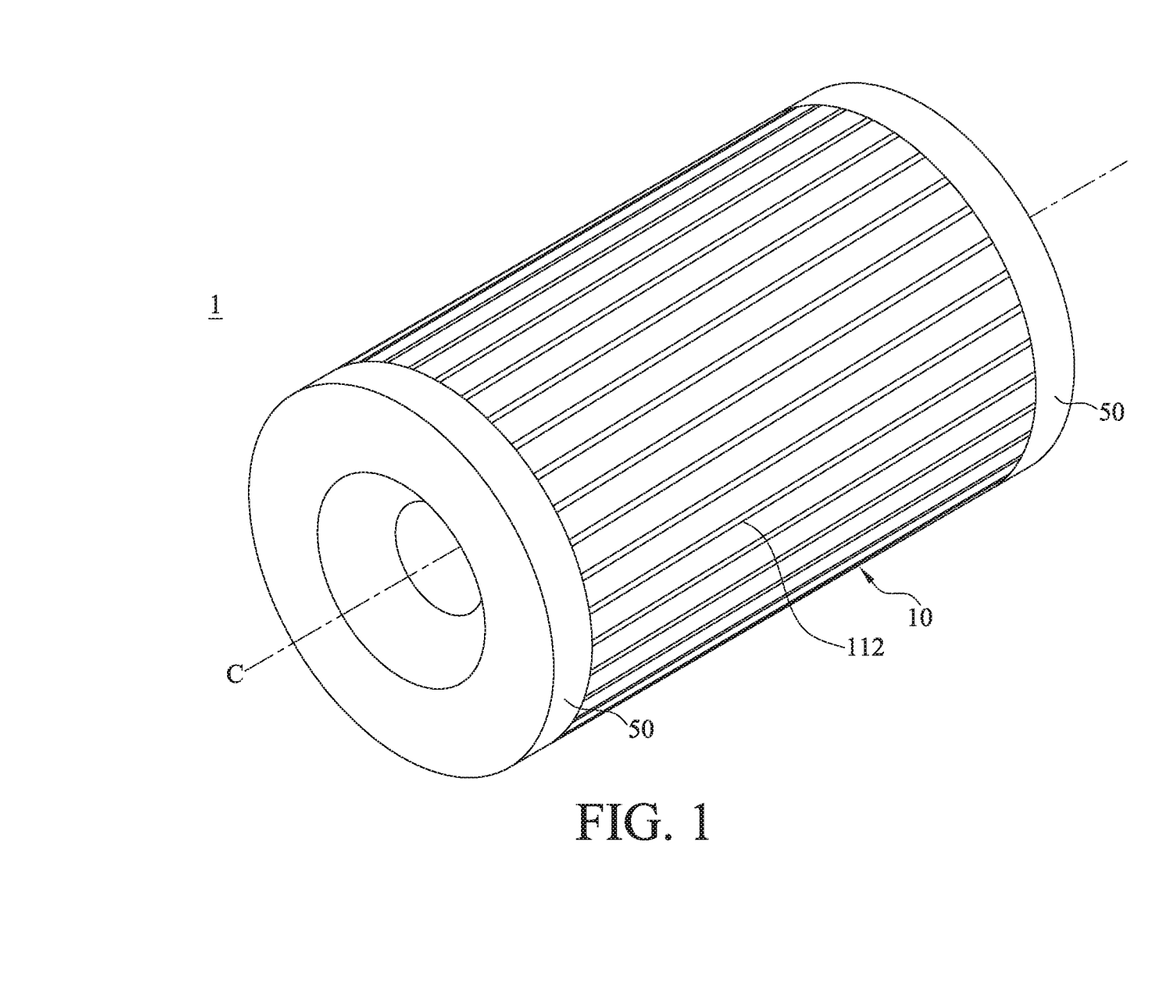
FIG. 1 is a perspective view of a rotor mechanism according to one embodiment of the disclosure.

Please refer to FIG. 1, which is a perspective view of a rotor mechanism according to one embodiment of the disclosure. This embodiment provides a rotor mechanism 1, which is adapted to an electric motor, but the present disclosure is not limited to the type of the electric motor.

Figure 2:
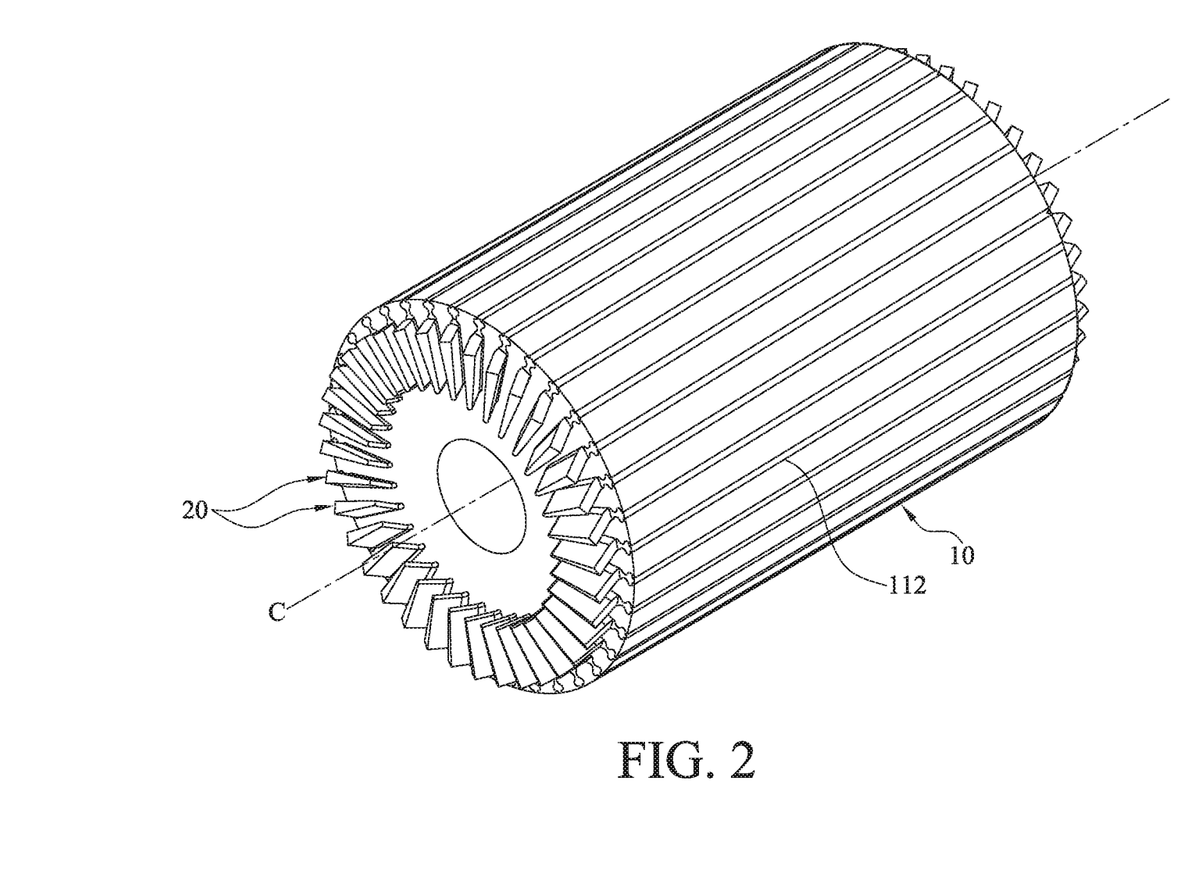
FIG. 2 is a perspective view of the rotor mechanism in FIG. 1 when end rings are removed.
Figure 3:
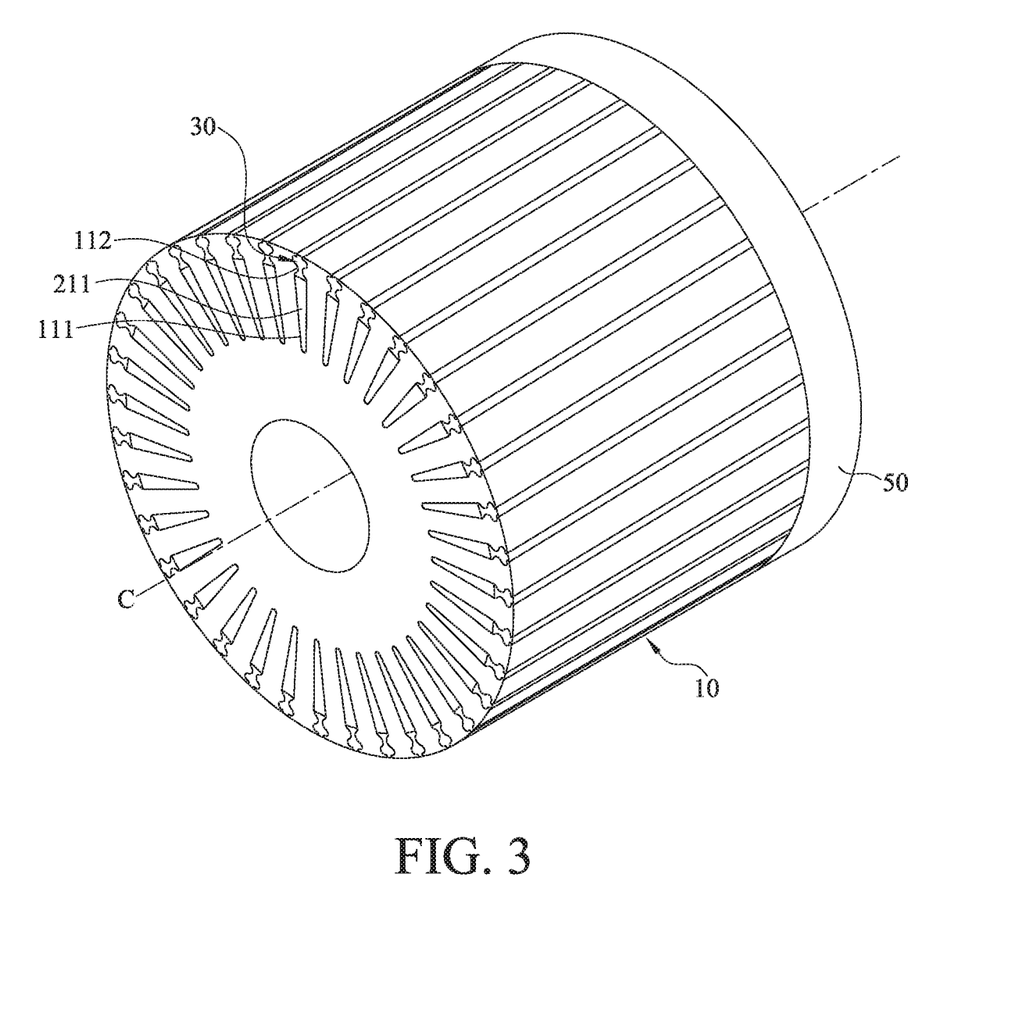
FIG. 3 is a partial perspective cross-sectional view of the rotor mechanism in FIG. 1.
Figure 4:
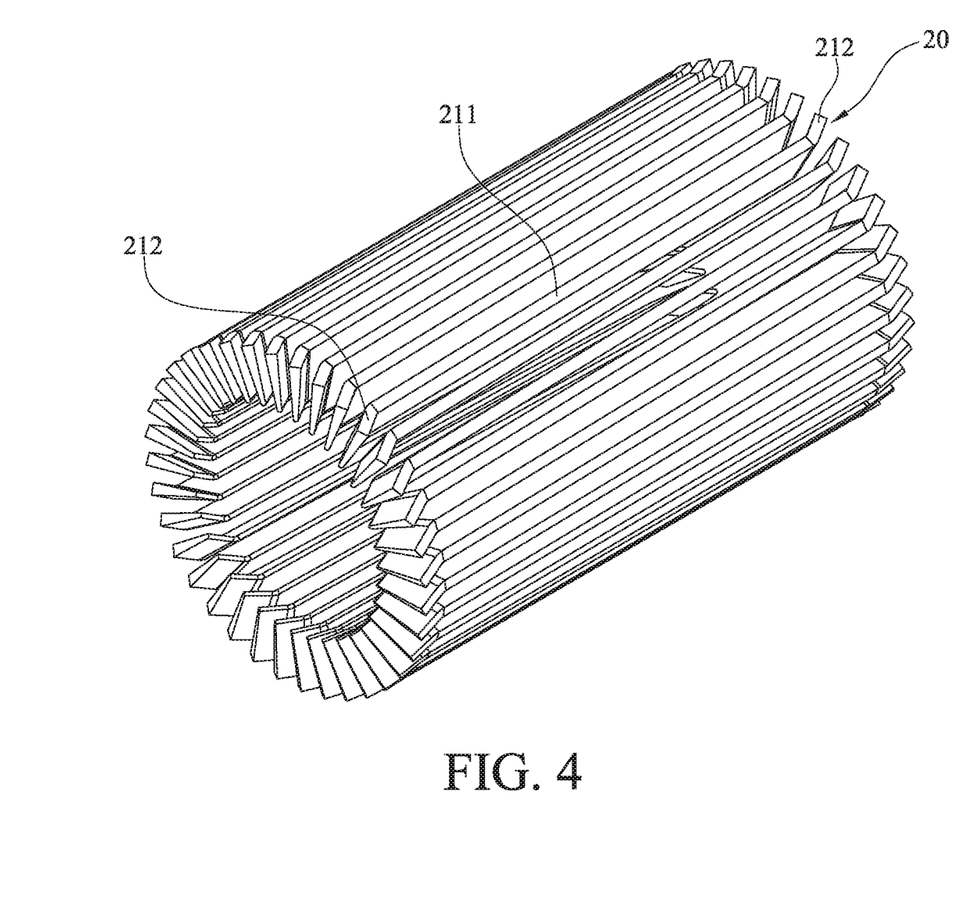
FIG. 4 is a perspective view of rotor bars in FIG. 1.
Figure 5:
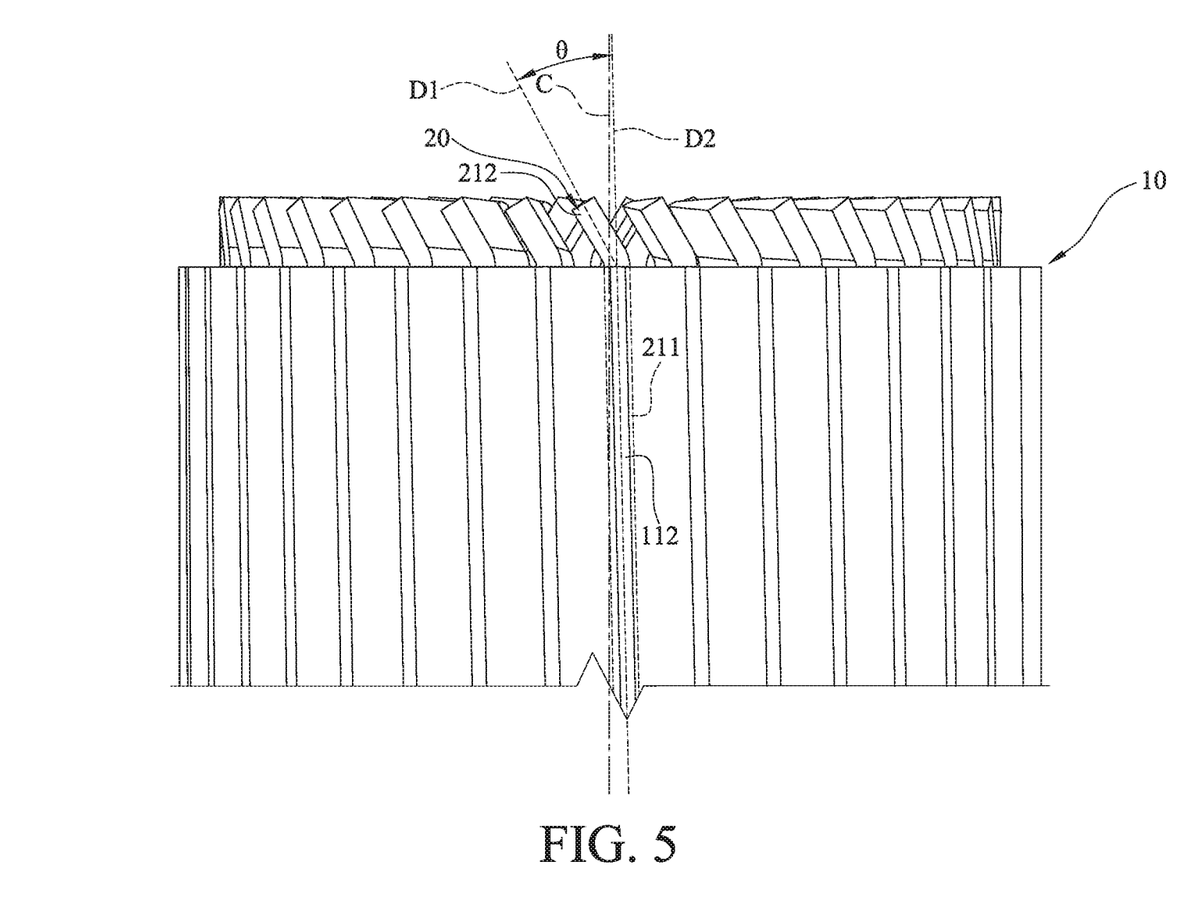
FIG. 5 is a partial enlarged side view of the rotor mechanism in FIG. 2.

Then, please further refer to FIGS. 2-5, FIG. 2 is a perspective view of the rotor mechanism in FIG. 1 when end rings are removed, FIG. 3 is a partial perspective cross-sectional view of the rotor mechanism in FIG. 1, FIG. 4 is a perspective view of rotor bars in FIG. 1, and FIG. 5 is a partial enlarged side view of the rotor mechanism in FIG. 2.

The rotor mechanism 1 includes a rotor core 10, a plurality of rotor bars 20, a plurality of conducting bars 30 and two end rings 50.

The rotor core 10 is made of, for example, a plurality of laminated silicon steel sheets. The rotor core 10 has a plurality of insertion slots 111. The insertion slots 111 penetrate through the rotor core 10 and are arranged along the edge (or the outer surface) of the rotor core 10.

In addition, the rotor core 10 further has a plurality of outer slots 112. The outer slots 112 are respectively connected to the insertion slots 111, and are located further away from a rotational axis C of the rotor core 10 than the insertion slots 111 (i.e., the outer slots 112 are respectively located at and connected to the outer side of the insertion slots 111), which makes the rotor core 10 become a double squirrel cage rotor, but the present disclosure is not limited thereto. For example, in some other embodiments, the insertion slots may be not connected to the outer slots. In addition, the outer slots 112 are optional. For example, in some other embodiments, the rotor core may have no outer slots but only have the insertion slots, such that the rotor core becomes a single squirrel cage rotor or an extended bar rotor.

In this embodiment, the insertion slot 111 and the outer slot 112 have an extension direction D2 that is non-parallel to the rotational axis C of the rotor core 10. That is, the insertion slots 111 and the outer slots 112 are inclined with respect to the rotational axis C of the rotor core 10 (as shown in FIG. 5). In such a case, the outer slots 112 are so-called "skewed slots", capable of improving the starting performance of the rotor mechanism 1 and decreasing the vibration and noise during operation, but the present disclosure is not limited thereto. For example, in some other embodiments, the extension direction of the insertion slots and the outer slots may be parallel to the rotational axis of the rotor core.

The rotor bars 20, also called rotor conductors, are made of, for example, copper. The rotor bars 20 are respectively disposed through (or inserted into) the insertion slots 111. In more detail, each rotor bar 20 includes an insertion portion 211 and two protruding portions 212, the protruding portions 212 are respectively connected at two opposite ends of the insertion portion 211, and the insertion portion 211 and the two protruding portions 212 are a single-piece construction of metal. The insertion portion 211 is the portion of the rotor bar 20 which is being inserted into and located within the insertion slot 111 of the rotor core 10, and the two protruding portions 212 are the portions of the rotor bar 20 which penetrate from (or stick out) two opposite sides of the rotor core 10. In addition, each protruding portion 212 has an extension direction D1, and the extension direction D1 has an angle θ with respect to an extension direction D2. That is, the protruding portions 212 are inclined or bent with respect to the insertion portion 211. In such a case, the protruding portions 212 are able to clamp and fix the rotor core 10 therebetween. However, it is understood that the present disclosure is not limited to the value of the angle θ, and the range of the angle θ, that can make the protruding portions 212 to clamp and fix the rotor core 10, falls into the scope of the present disclosure.

The end rings 50 and the conducting bars 30 can be formed at the same process. In detail, by casting aluminum on the rotor core 10, the outer slots 112 of the rotor core 10 would be filled with aluminum material so as to form the conducting bars 30 as the same amount of the outer slots 112, and then the aluminum material is accumulated on the two opposite sides of the rotor core 10 to cover the protruding portions 212 so as to form end rings 50.

Figure 6:
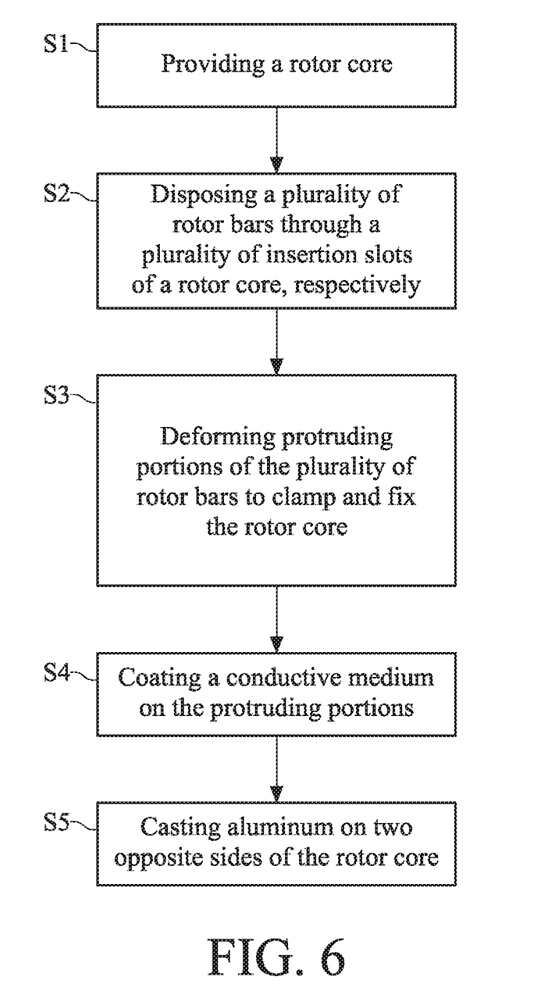
FIG. 6 is a flow chart showing a method for manufacturing the rotor mechanism according to the disclosure.

Then, more detailed explanation of a method for manufacturing the rotor mechanism 1 is described in below. Please refer to FIG. 6 with the aforementioned figures, FIG. 6 is a flow chart showing a method for manufacturing the rotor mechanism according to the disclosure.

Firstly, providing a rotor core 10 (step S1). In detail, a temporary shaft (not shown) can be disposed through a center hole of the silicon steel sheets, and the temporary shaft is tight fit with the silicon steel sheets (having a positive and negative tolerances less than 0.05 millimeter), allowing these silicon steel sheets to be laminated together to form the rotor core 10, and the outer slots 112 and the insertion slots 111, that are arranged along the edge of the rotor core 10, as well.

Then, disposing a plurality of rotor bars through the insertion slots 111 of the rotor core 10 (step S2). In detail, the rotor bars are longer than the insertion slots 111 so that the rotor bars would penetrate through the two opposite sides of the rotor core 10 when being disposed through the insertion slots 111. The portions of the rotor bars 20 inside the insertion slots 111 are so-called insertion portions 211, and the portions of the rotor bars 20 penetrating through the rotor core 10 are so-called protruding portions 212. The rotor bars 20 are made of, for example, copper, and the use of inserting the copper rotor bars 20 helps to reduce manufacturing cost and helps to improve the starting performance as well.

Then, deforming the protruding portions 212 of the rotor bars 20 to clamp and fix the rotor core 10 (step S3). In detail, the penetrating portions 212, protruding from the two opposite sides of the rotor core 10, can be pressed and then be rotated or twisted by a deform machine (not shown), to be inclined or bent with respect to the insertion portions 211. As a result, the protruding portions 212 are able to tightly press against the two opposite sides of the rotor core 10 so as to clamp and fix the rotor core 10 therebetween.

In addition, while the rotor bars 20 being deformed by the deform machine, not only the protruding portions 212 have an angle with respect to the insertion portions 211, the insertion portions 211 are also be slightly curved to become tight fit with the laminated silicon steel sheets of the rotor core 10, which is also beneficial to fix the rotor bars 20 in place.

Furthermore, the present disclosure is not limited to the way of deforming the rotor bars 20, other manners, that can deform the protruding portions 211 of the rotor bars 20 to clamp and fix the rotor core 10, all fall within the scope of the present disclosure.

Moreover, before inserting the rotor bars 20 into the rotor core 10, at least two long rods (not shown) can be inserted into the outer slots 112 of the rotor core 10 to twist the rotor core 10 in order to incline the insertion slots 111 and the outer slots 112 with respect to the rotational axis C of the rotor core 10, thus the extension direction D2 becomes non-parallel to the rotational axis C of the rotor core 10. As a result, the outer slots 112 are skewed with respect to the rotational axis C to become so-called "skewed slots", such that the starting performance and the efficiency are both improved, and the energizing noise and the vibration response are reduced. However, the step of twisting the rotor core is optional, the present disclosure is not limited thereto.

Then, coating a conductive medium on the protruding portions 212 (step S4). The conductive medium is made of, for example, silver-containing compounds, and its melting temperature and oxidizing temperature are both greater than that of aluminum (the melting temperature of aluminum is approximately 650° C., and the oxidizing temperature of aluminum is approximately 300° C.).

Then, casting aluminum on the rotor core 10 (step S5). In detail, the temporary shaft is removed before step S5, and then molten aluminum material are provided on the two opposite sides of the rotor core 10 to form the end rings 50 covering the protruding portions 212. While casting aluminum, aluminum material would also flow into the outer slots 112 to form the conducting bars 30 to connect the two end rings 50, which is also beneficial to improve the starting performance of the rotor mechanism 1.

In addition, because the conductive medium is coated on the protruding portions 212 before step S5, the conductive medium can protect the protruding portions 212 from melting by the molten aluminum material, and can prevent an oxide layer, which will block the electrical connection between the protruding portions 212 and the aluminum material, from forming on the protruding portions 212. That is, the conductive medium can protect the protruding portions 212 from overheating so as to suppress the temperature of the protruding portions 212 to prevent it from melting and forming oxide layer.

In addition, the rotor core 10 is clamped and fixed by the protruding portions 212 of the rotor bars 20, thus the pressure from the aluminum would not easily deform the rotor core 10 and move the rotor bars 20. Accordingly, there is no need of an auxiliary support for supporting and fixing the rotor core 10 while forming the end rings 50, and the end rings 50 and the conducting bars 30 are able to be formed together at the process of casting aluminum but not formed by welding.

According to the rotor mechanism and the method as discussed above, the rotor core can be fixed in place by being clamped by the protruding portions of the rotor bars, thus there is no need of an auxiliary support for supporting and fixing the rotor core during the process of casting aluminum, and it is not necessary to form the end rings by welding, thereby solving the problem of forming the end rings in the related art.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A rotor mechanism, comprising:
   a rotor core, having a plurality of insertion slots arranged along an edge of the rotor core and a plurality of outer slots respectively connected to the plurality of insertion slots and located at the outer side of the plurality of insertion slots;
   a plurality of rotor bars, each of the plurality of rotor bars having an insertion portion and two protruding portions, the insertion portions respectively located in the plurality of insertion slots, wherein in each of the plurality of rotor bars, the two protruding portions are respectively connected to two opposite ends of the insertion portion and respectively protrude from two opposite sides of the rotor core, and the two protruding portions each has an extension direction, that has an angle with respect to an extension direction of the insertion portion, in order to clamp and fix the rotor core therebetween;
   two end rings, respectively disposed at the two opposite sides of the rotor core and cover the protruding portions; and
   a plurality of conducting bars, respectively located in the plurality of outer slots, and located between and connected to the end rings,
   wherein the protruding portions of the plurality of rotor bars are not parallel to the plurality of conducting bars in the plurality of outer slots of the rotor core.

2. The rotor mechanism according to claim 1, wherein each of the plurality of insertion slots has an extension direction that is non-parallel to a rotational axis of the rotor core.

3. The rotor mechanism according to claim 1, wherein the material of the plurality of conducting bars is the same as the material of the end rings.

4. The rotor mechanism according to claim 1, wherein the material of the plurality of conducting bars is different from the material of the plurality of rotor bars.

5. A method for manufacturing a rotor mechanism as claimed in claim 1, comprising:
   Disposing the plurality of rotor bars through the plurality of insertion slots of the rotor core, respectively;
   deforming the protruding portions of the plurality of rotor bars to clamp and fix the rotor core; and
   forming the two end rings at the two opposite sides of the rotor core, respectively, so as to cover the protruding portions and to form the plurality of conducting bars in the plurality of outer slots of the rotor core, respectively, wherein the protruding portions of the plurality of rotor bars are not parallel to the plurality of conducting bars in the plurality of outer slots of the rotor core.

6. The method according to claim 5, wherein forming the two end rings comprises: casting aluminum on the two opposite sides of the rotor core so as to respectively form the two end rings and to fill aluminum into the plurality of outer slots on the rotor core that are respectively located at the outer side of the plurality of insertion slots to form the plurality of conducting bars in the plurality of outer slots of the rotor core.

7. The method according to claim 6, further comprising, before forming the end rings, coating a conductive medium on the protruding portions, wherein, the melting temperature and the oxidizing temperature of the conductive medium are both greater than the melting temperature and the oxidizing temperature of aluminum.

* * * * *